US008010356B2

(12) United States Patent
Deng et al.

(10) Patent No.: US 8,010,356 B2
(45) Date of Patent: Aug. 30, 2011

(54) PARAMETER LEARNING IN A HIDDEN TRAJECTORY MODEL

(75) Inventors: Li Deng, Sammamish, WA (US); Dong Yu, Kirkland, WA (US); Xiaolong Li, Sammamish, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1005 days.

(21) Appl. No.: 11/356,898

(22) Filed: Feb. 17, 2006

(65) Prior Publication Data

US 2007/0198260 A1    Aug. 23, 2007

(51) Int. Cl.
*G10L 15/00*    (2006.01)
(52) U.S. Cl. .................. 704/237; 704/218; 704/244
(58) Field of Classification Search .............. 704/237, 704/209, 218, 244
See application file for complete search history.

(56) References Cited

U.S. PATENT DOCUMENTS

| | | | | |
|---|---|---|---|---|
| 6,076,058 | A * | 6/2000 | Chengalvarayan | 704/256.8 |
| 6,609,093 | B1 * | 8/2003 | Gopinath et al. | 704/236 |
| 6,618,699 | B1 * | 9/2003 | Lee et al. | 704/209 |
| 7,010,167 | B1 * | 3/2006 | Ordowski et al. | 382/225 |
| 2003/0216911 | A1 * | 11/2003 | Deng et al. | 704/227 |
| 2003/0225719 | A1 * | 12/2003 | Juang et al. | 706/48 |
| 2004/0019483 | A1 * | 1/2004 | Deng et al. | 704/239 |
| 2004/0078198 | A1 * | 4/2004 | Hernandez-Abrego et al. | 704/231 |
| 2004/0143435 | A1 * | 7/2004 | Deng et al. | 704/256 |
| 2004/0199382 | A1 * | 10/2004 | Bazzi et al. | 704/209 |
| 2004/0199386 | A1 * | 10/2004 | Attias et al. | 704/240 |
| 2004/0260548 | A1 * | 12/2004 | Attias et al. | 704/236 |
| 2006/0178887 | A1 * | 8/2006 | Webber | 704/256 |
| 2006/0229875 | A1 * | 10/2006 | Acero et al. | 704/261 |
| 2007/0129943 | A1 * | 6/2007 | Lei et al. | 704/240 |

OTHER PUBLICATIONS

J-L. Zhou, F. Seide, and L. Deng. Coarticulation modeling by embedding a target-directed hidden trajectory model into HMM-model and training. In Proceedings ICASSP, vol. 1, pp. 744-747, 2003.*
L. Xu and M. I. Jordan. On convergence properties of the EM algorithm for Gaussian mixtures. Neural Computation, 8:129-151, 1996.*
K. Tokuda, H. Zen, and T. Kitamura, "Reformulating the HMM as a trajectory model," in Proceedings Beyond HMM Workshop, Tokyo, Dec. 2004.*
L. Deng, L. J. Lee, H. Attias, and A. Acero. "A structured speech model with continuous hidden dynamics and prediction-residual training for tracking vocal tract resonances," Proc. ICASSP, vol. 1, 2004, pp. 557-560.*
Schraudolf, N.: Gradient-based manipulation of non-parametric entropy estimates. IEEE Trans. on Neural Networks 16 (2004) 159-195.*
L. Deng, I. Bazzi, and A. Acero, "Tracking vocal tract resonances using an analytical nonlinear predictor and a target-guided temporal constraint," in Proc. EUROSPEECH, 2003, pp. 73-76.*

(Continued)

*Primary Examiner* — Richemond Dorvil
*Assistant Examiner* — Greg Borsetti
(74) *Attorney, Agent, or Firm* — Westman, Champlin & Kelly

(57) ABSTRACT

Parameters for distributions of a hidden trajectory model including means and variances are estimated using an acoustic likelihood function for observation vectors as an objection function for optimization. The estimation includes only acoustic data and not any intermediate estimate on hidden dynamic variables. Gradient ascent methods can be developed for optimizing the acoustic likelihood function.

8 Claims, 5 Drawing Sheets

OTHER PUBLICATIONS

Dusan, S., 2000. Statistical estimation of articulatory trajectories from the speech signal using dynamical and phonological constraints. Ph.D. Thesis, Department of Electrical and Computer Engineering, University of Waterloo, Waterloo, Canada, April.*

Rigdon. "Not Positive Definite Matrices—Causes and Cures" 1997. Retrieved from: http://www2.gsu.edu~mkteer/npdmatri.html Sep. 3, 2010.*

Deng et al. "Learning Statistically Characterized Resonance Targets in a Hidden Trajectory Model of Speech Coarticulation and Reduction" Sep. 4-8, 2005.*

Deng et al. "A Long-Contextual-Span Model of Resonance Dynamics for Speech Recognition: Parameter Learning and Recognizer Evaluation" Nov. 28, 2005.*

Yu et al. "Evaluation of a Long-Contextual-Span Hidden Trajectory Model and Phonetic Recognizer Using A Lattice Search" Sep. 4-8, 2005.*

Deng et al. "A Hidden Trajectory Modelwith Bi-Directional Target-Filtering: Cascaded vs. Integrated Implementation for Phonetic Recognition" 2005.*

Deng et al. "A Generative Modeling Framework for Structured Hidden Speech Dynamics" 2005.*

Deng et al. "A Structured Speech Modelwith Continuous Hidden Dynamics and Prediction-Residual Training for Tracking Vocal Tract Resonances" 2004.*

Pinheiro et al. "Unconstrained parametrizations for variance-covariance matrices" 1996.*

Moller et al. "A Scaled Conjugate Gradient Algorithm for Fast Supervised Learning" 1993.*

Deng et al. "Novel Acoustic Modeling With Structured Hidden Dynamics for Speech Coarticulation and Reduction" 2004.*

Deng et al. "A Bidirectional Target-Filtering Model of Speech Coarticulation and Reduction: Two-Stage Implementation for Phonetic Recognition" Jan. 2006.*

U.S. Appl. No. 10/944,262, filed Sep. 14, 2004, Deng et al.
U.S. Appl. No. 11/069,474, filed Mar. 1, 2005, Acero et al.
U.S. Appl. No. 11/093,833, filed Mar. 30, 2005, Acero et al.
U.S. Appl. No. 11/356,905, filed Feb. 17, 2006, Li et al.

L. Deng, D. Yu, and A. Acero. "A quantitative model for formant dynamics and contextually assimilated reduction in fluent speech", in Proc. ICSLP, pp. 719-722, Jeju, Korea, 2004.

L. Deng, X. Li, D. Yu, and A. Acero. "A hidden trajectory model with bi-directional target-filtering: Cascaded vs. integrated implementation for phonetic recognition", in Proc. IEEE ICASSP, pp. 337-340, Mar. 2005, Philadelphia.

L. Deng, D. Yu, and A. Acero. "Learning statistically characterized resonance targets in a hidden trajectory model of speech coarticulation and reduction", in Proc. Interspeech 2005, Lisbon, Sep. 2005, pp. 1097-1100.

D. Yu, L. Deng and A. Acero. "Evaluation of a long-contextual-span trajectory model and phonetic recognizer using A* lattice search", in Proc. Interspeech, Lisbon, Sep. 2005, pp. 553-556.

M. Akagi. "Modeling of contextual effects based on spectral peak interaction," in J. Acoust. Soc. Am., vol. 93, No. 2, pp. 1076-1086, 1993.

J. Glass. "A probablistic framework for segment-based speech recognition," in Computer Speech and Language, vol. 17, 2003, pp. 137-152.

J. Krause and L. Braida. "Acoustic properties of naturally produced clear speech at normal speaking rates," in J. Acoust. Soc. Am., vol. 115, No. 1, pp. 362-378, 2004.

* cited by examiner

PARAMETER LEARNING IN A HIDDEN TRAJECTORY MODEL

BACKGROUND

A statistical hidden trajectory model uses temporal filtering of hidden vocal tract resonance targets to estimate a hidden trajectory for a vocal tract resonance. The targets used in the hidden trajectory model are described as being stochastic with a phoneme-dependent probability distribution. Thus each phoneme has a mean target and a target variance. In the past, the mean target and the target variance have been determined using a vocal tract resonance tracker.

Using the tracker, hidden trajectory values for individual phonemes are collected and the statistical distribution of the vocal tract resonances is used to identify the means and variances for the targets. Because the vocal tract resonance tracker is not perfect, errors in the vocal tract resonances identified by the tracker are propagated into the target distributions. As a result, the target distributions are incorrect resulting in poor performance of the hidden trajectory model.

The discussion above is merely provided for general background information and is not intended to be used as an aid in determining the scope of the claimed subject matter.

SUMMARY

Parameters for distributions of a hidden trajectory model including means and variances are estimated using a likelihood function for an observation vector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
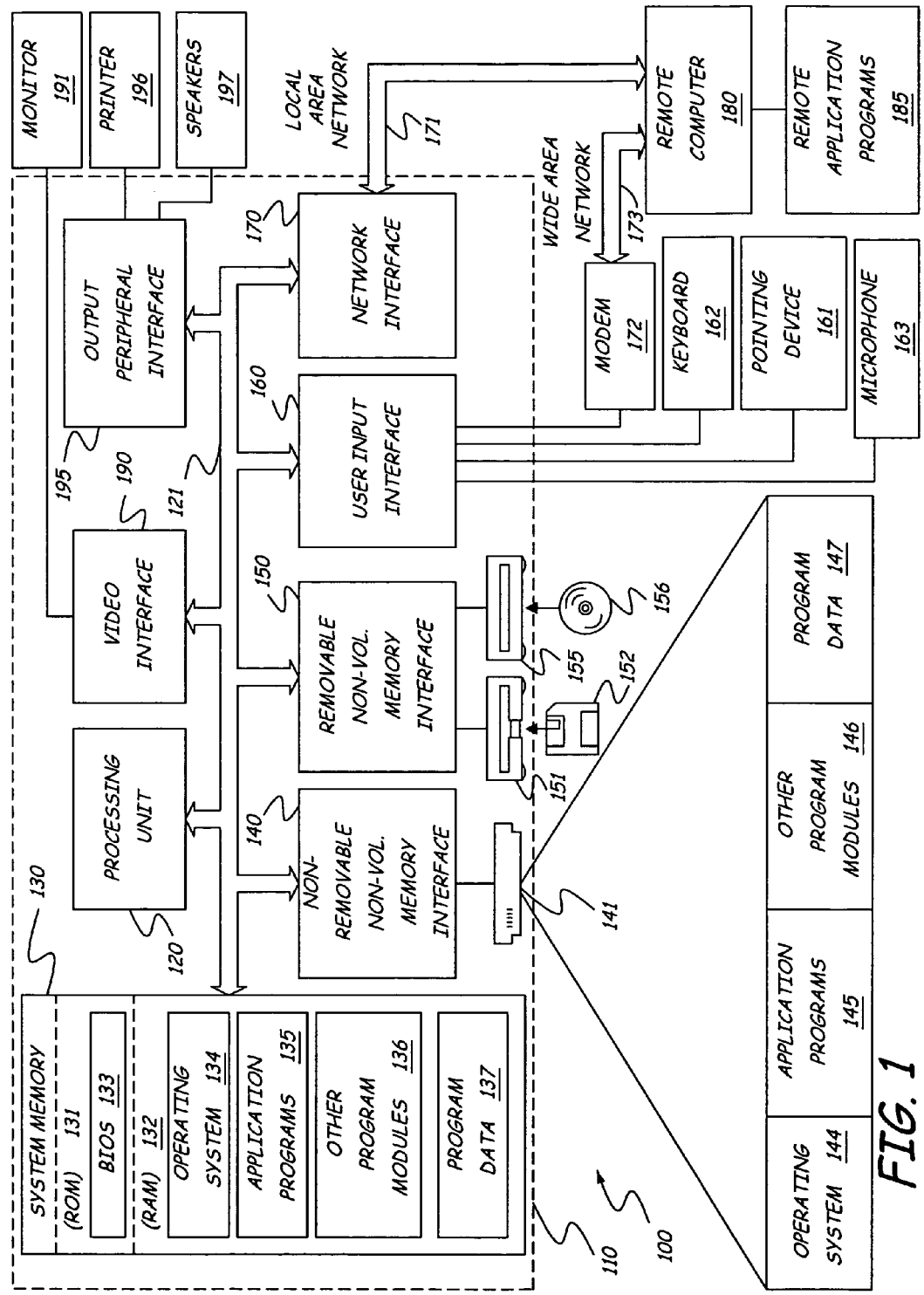
FIG. 1 is a block diagram of one computing environment in which some embodiments may be practiced.

FIG. 1 illustrates an example of a suitable computing system environment 100 on which concepts presented herein may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Concepts presented herein are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Concepts presented herein may be described in the general context of computer-executable instructions, such as program modules, being executed by a computer. Generally, program modules include routines, programs, objects, components, data structures, etc. that perform particular tasks or implement particular abstract data types. Some concepts are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments of the concepts presented herein includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
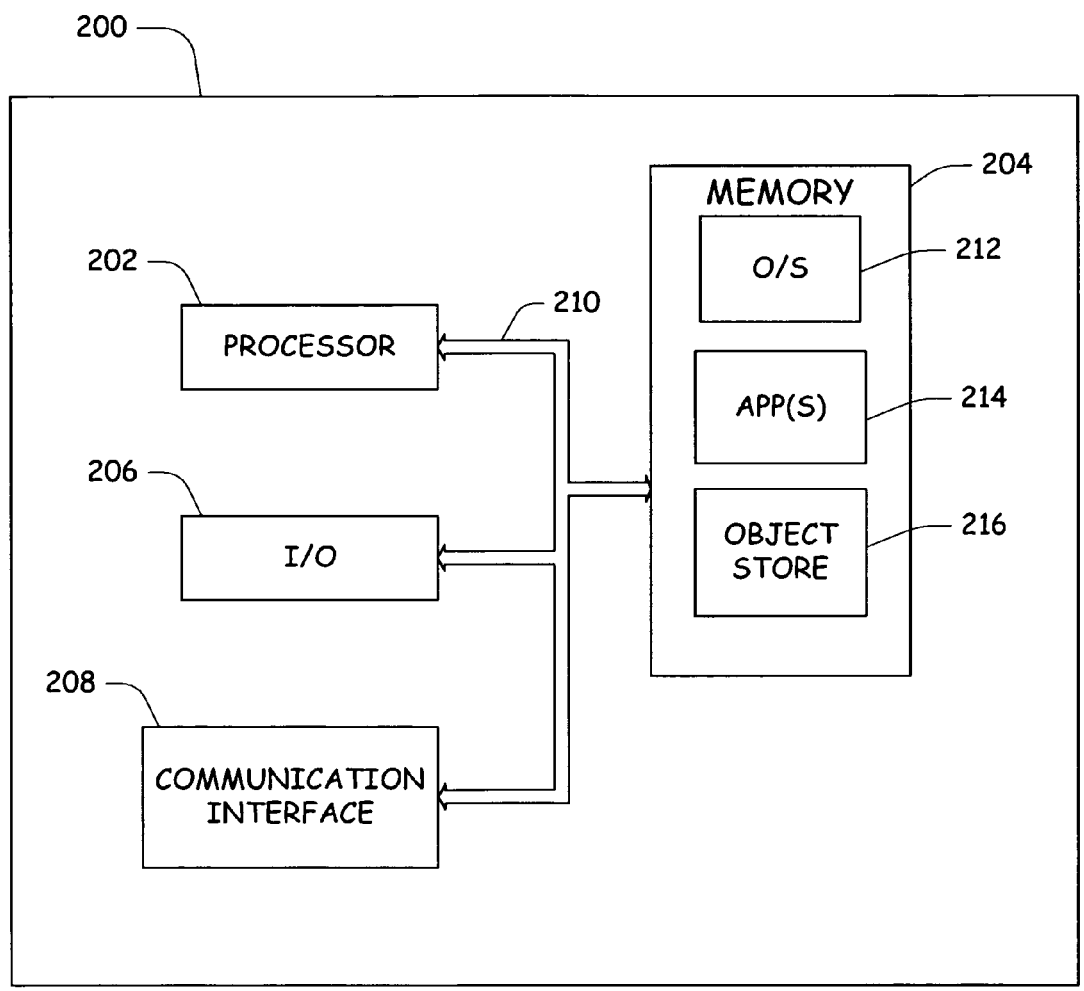
FIG. 2 is a block diagram of an alternative computing environment in which some embodiments may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one embodiment, is a WINDOWS® CE brand operating system commercially available from Microsoft Corporation. Operating system 212 can be designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

A hidden trajectory model is a two stage model that provides a probability of an observation vector given a speech unit such as a phoneme. In the first stage of the model, a probability distribution for vocal tract resonance (VTR) trajectories is described in terms of a filtered sequence of vocal tract resonance (VTR) target distributions. In the second stage of the hidden trajectory model, the probability of an observation vector is described in terms of a non-linear function of the vocal tract resonance trajectory and a residual model.

Under one embodiment, the first stage of the hidden trajectory model describes the vocal tract resonance trajectory as being generated from segmental targets applied to a bi-directional finite impulse response filter as:

$$z_s(k) = h_{s(k)} * t(k) = \sum_{\tau=k-D}^{k+D} c_\gamma \gamma_{s(\tau)}^{|k-\tau|} t_{s(\tau)} \quad \text{EQ. 1}$$

where $z_s(k)$ is the trajectory in the kth time frame for speech unit s, $t_{s(\tau)}$ is the VTR target vector for speech unit s at time frame $\tau$, $\gamma_{s(\tau)}$ is a coarticulation parameter that indicates the spatial extent of coarticulation and is correlated with speaking effort and in one embodiment has a value of 0.6 for all speech units s, and 2D+1 represents the length of the filter's impulse response $h_{s(k)}$ and determines the temporal extent of coarticulation.

Under one embodiment, the speech unit-dependent target vector $t_s$ in EQ. 1 is assumed to be a random vector with a Gaussian distribution:

$$p(t|s) = N(t; \mu_{T_s}, \Sigma_{T_s}) \quad \text{EQ. 2}$$

where $\mu_{T_s}$ is the mean of the target vector and $\Sigma_{T_s}$ is the variance of the target vector, which in many embodiments is assumed to be diagonal. Under one embodiment, the model tracts the frequency and bandwidth of four vocal tract resonances. Under such an embodiment, the mean contains eight components such that $\mu_{T_s} = \{f_1\ f_2\ f_3\ f_4\ b_1\ b_2\ b_3\ b_4\}$, where $f_x$ represents a target frequency and $b_x$ represents a corresponding target bandwidth for a vocal tract resonance.

Due to the linearity between z and t shown in EQ. 1, the assumption that the target vector is a Gaussian leads to the VTR trajectory also being a Gaussian such that:

$$p(z(k)|s) = N[z(k); \mu_{z(k)}, \Sigma_{z(k)}] \quad \text{EQ. 3}$$

Combining EQS. 1, 2 and 3, the mean vector of the Gaussian distribution for the vocal tract resonance trajectory z(k) is derived as:

$$\mu_{z(k)} = \sum_{\tau=k-D}^{k+D} c_\gamma \gamma_{s(\tau)}^{|k-\tau|} \mu_{Ts(\tau)} = a_k \cdot \mu_T \quad \text{EQ. 4}$$

where $a_k$ is a filter parameter vector with individual elements of the vector consisting of equations, $\mu_T$ is a matrix of target means, with a separate row for each speech unit that can be observed during recognition and a separate column for each component of the target vector. In one embodiment, 58 speech units are used. The right hand side of EQ. 4 represents the dot product of filter parameter vector $a_k$ and matrix $\mu_T$.

Figure 3:
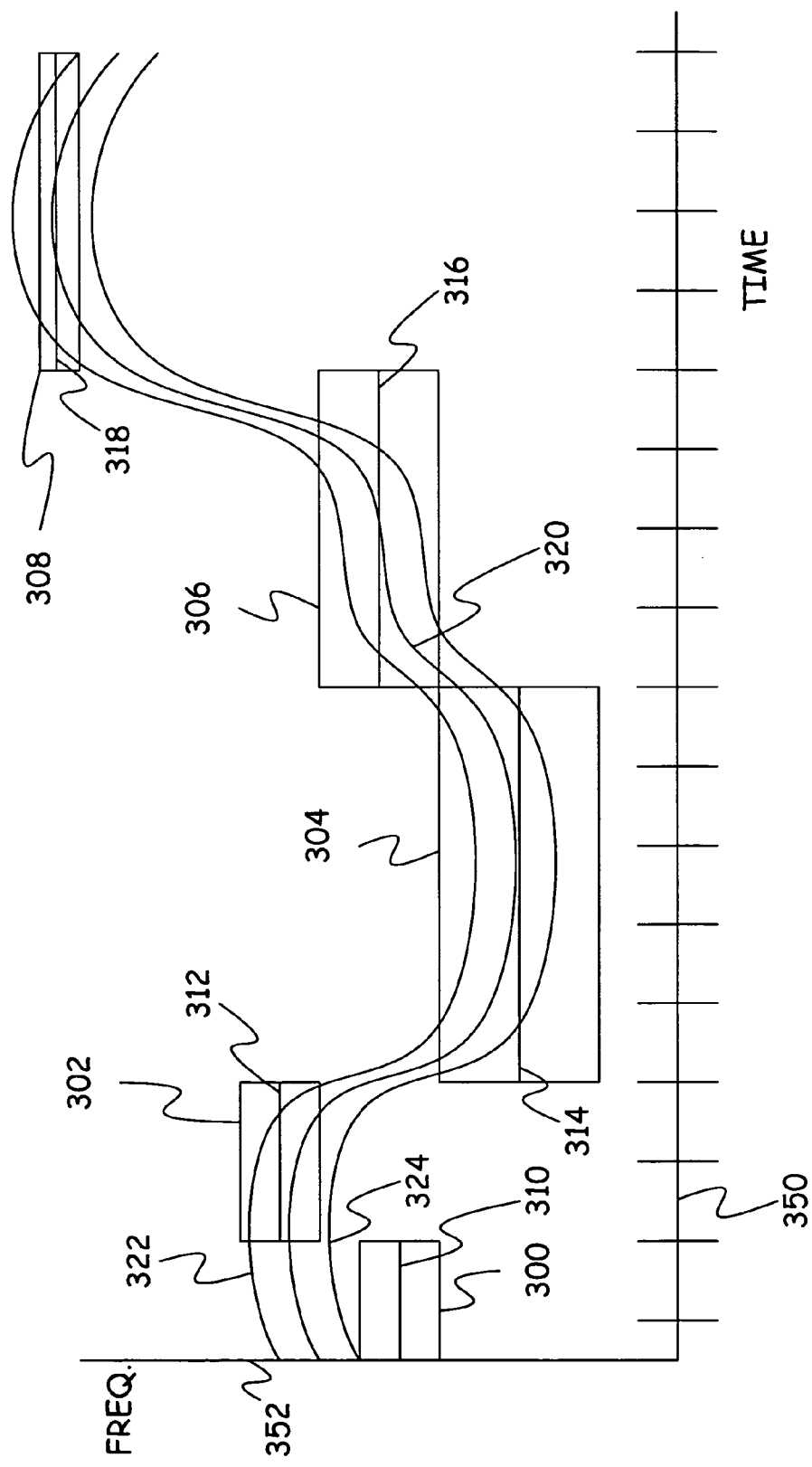
FIG. 3 is a graph showing trajectories and targets for a vocal tract resonance.

The relationship between the VTR trajectory distributions and the target vector distributions is shown in FIG. 3 for a single vocal tract resonance frequency. In FIG. 3, time is shown along horizontal axis 350 and frequency is shown along vertical axis 352.

FIG. 3 shows five target distributions 300, 302, 304, 306 and 308, represented as boxes, having target means 310, 312, 314, 316 and 318 respectively. In FIG. 3, the height of each box representing a target vector distribution provides an indication of the variance of the distribution.

Based on the bi-directional filtering of EQ. 4, the mean for the vocal tract resonance trajectory follows the path 320 and has a variance as indicated by the vertical distance between upper band 322 and lower band 324.

There is no explicit expression for the filter parameter vector $a_k$ in EQ. 4, as the vector depends on constituents and ordering of the phones/units in each of the training utterances. One way to represent each $a_k$ is by way of construction. It can be constructed based on the ordering and identity of the phones in the phone or unit sequence in the speech utterance. Specifically, each $a_k$ is generated based on an alignment of training speech frames with text expressed in terms of phone-like unit. It is worth noting that the alignment can be obtained either from the training data or from the alignment results of a baseline HMM system. This alignment indicates which target means $\mu_{T_s}$ and smoothing parameters $\gamma_s$ are used to determine the current trajectory mean in EQ. 4. Using these alignments, the values of $a_k$ can be determined through an algorithm. For example, if instead of using 58 speech units, 5 speech units were used such that:

$$\mu_T = \begin{bmatrix} \mu_T(1) \\ \mu_T(2) \\ \mu_T(3) \\ \mu_T(4) \\ \mu_T(5) \end{bmatrix} \quad \text{EQ. 5}$$

and the training showed an alignment between speech units and time frames k as:

| | Speech Unit | | |
|---|---|---|---|
| | 1 | 2 | 4 |
| Frame (k) | 1   2 | 3   4 | 5   6 |

TABLE 1 the following values for the filter parameters $a_k$ would be obtained:

$a_1 = [c_1 + c_1\gamma_1\ c_2\gamma_2{}^2\ 0\ c_4\gamma_4{}^3\ 0]$
$a_2 = [c_1\gamma_1 + c_1\ c_2\gamma_2\ 0\ c_4\gamma_4{}^2 + c\gamma_4{}^3\ 0]$
$a_3 = [c_1\gamma_1{}^2 + c_1\gamma_1\ c_2\ 0\ c_4\gamma_4 + c_4\gamma_4{}^2 + c_4\gamma_4{}^3\ 0]$
$a_4 = [c_1\gamma_1{}^3 + c_1\gamma_1{}^2\ c_2\gamma_2\ 0\ c_4 + c_4\gamma_4 + c_4\gamma_4{}^2\ 0]$
$a_5 = [c_1\gamma_1{}^3\ c_2\gamma_2{}^2\ 0\ c_4\gamma_4 + c_4 + c_4\gamma_4\ 0]$
$a_6 = [0\ c_2\gamma_2{}^3\ 0\ c_4\gamma_4{}^2 + c_4\gamma_4 + c_4\ 0]$ where a filter size of D=3 has been used and each filter parameter vector contains five elements. Using EQ. 4 above, each fth component of $\mu_{z(k)}$ is:

$$\mu_{z(k)}(f) = \sum_{l=1}^{L} a_k(l) \mu_T(l, f) \quad \text{EQ. 6}$$

where l is an index for the speech units, L is the total number of speech units available in the language, which in one embodiment is 58, and f is an index into the frequency and bandwidth components of the target vector.

Similarly, the covariance matrix in EQ. 3 can be similarly derived as:

$$\sum_{z(k)} = \sum_{\tau=k-D}^{k+D} c_\gamma^2 \gamma_{s(\tau)}^{2|k-\tau|} \sum_{Ts(\tau)}$$ EQ. 7

Approximating the covariance matrix by a diagonal matrix for each speech unit l, the elements of the diagonal are represented a vector:

$$\sigma_{z(k)}^2 = v_k \cdot \sigma_T^2$$ EQ. 8 where the target covariance matrix is also approximated as diagonal:

$$\Sigma_T(l) \approx \begin{bmatrix} \sigma_T^2(l,1) & 0 & \cdots & 0 \\ 0 & \sigma_T^2(l,2) & \cdots & 0 \\ \vdots & \vdots & \ddots & \vdots \\ 0 & 0 & \cdots & \sigma_T^2(l,8) \end{bmatrix}$$ EQ. 9 with the fth element of the vector in EQ. 8 being:

$$\sigma_{z(k)}^2(f) = \sum_{l=1}^{L} v_k(l) \sigma_T^2(l,f)$$ EQ. 10

Note that in EQS. 6 and 10, $a_k$ and $v_k$ are frame-dependent (k) vectors that are both a function of the speech unit identities and temporal orders in the utterance but that are independent of the vocal tract resonance dimension f.

The second stage of the Hidden Trajectory Model provides a probabilistic mapping from the stochastic Vocal Tract Resonance trajectory z(k) to a stochastic observation trajectory o(k) such that the mapping provides the probability of an observed vector given a hidden trajectory value. Under one embodiment, the observation trajectory takes the form of LPC cepstra and the mapping uses a non-linear prediction function F[z(k)] and a Gaussian residual model $(\mu_{r_{s(k)}}, \Sigma_{r_{s(k)}})$ where $\mu_{r_{s(k)}}$ and $\Sigma_{r_{s(k)}}$ are the mean and covariance, respectively, of the residual model. The residual model vector can be expressed as:

$$r = o(k) - F[z(k)]$$

The residual model vector can be modeled as a Gaussian parameterized by residual mean vector $\mu_{r_{s(k)}}$ and covariance matrix $\Sigma_{r_{s(k)}}$:

$$p(r_s(k)|z(k),s) = N[r_s(k); \mu_{r_{s(k)}}, \Sigma_{r_{s(k)}}].$$

In one particular embodiment, the mapping is a Gaussian distribution:

$$p(o(k)|z(k),s) \approx N[o(k); F[z(k)] + \mu_{r_{s(k)}}, \Sigma_{r_{s(k)}}]$$ EQ. 11 where $$F_n[z(k)] = \frac{2}{n} \sum_{p=1}^{P} e^{-\pi n \frac{b_p(k)}{f_s}} \cos\left(2\pi n \frac{f_p(k)}{f_s}\right)$$ EQ. 12 is the value of F[z(k)] for the nth LPC cepstral order, $f_s$ is the sampling frequency of the speech signal, $f_p$ is a vocal tract resonance frequency and $b_p$ is a corresponding vocal tract resonance bandwidth, and P is the number of vocal tract resonance frequencies. As noted above, in one embodiment P=4.

For computational tractability, it is desirable to linearize the non-linear function F[z(k)]. Under one embodiment, this is accomplished using a first order Taylor series expansion such that:

$$F_n[z(k)] \approx F_n[z_0(k)] + F_n'[z_0(k)](z(k) - z_0(k))$$ EQ. 13 where $F_n'[z_0(k)]$ is the derivative of $F_n[z_0(k)]$ with respect to a VTR dimension, such that:

$$F_n'[f_p(k)] = \frac{\delta F_n[z_0(k)]}{\delta f_p(k)} = -\frac{4\pi}{f_s} e^{-\pi n \frac{b_p(k)}{f_s}} \sin\left(2\pi n \frac{f_p(k)}{f_s}\right)$$ EQ. 14 for the pth VTR frequency component of z, and $$F_n'[b_p(k)] = \frac{\delta F_n[z_0(k)]}{\delta b_p(k)} = -\frac{2\pi}{f_s} e^{-\pi n \frac{b_p(k)}{f_s}} \cos\left(2\pi n \frac{f_p(k)}{f_s}\right)$$ EQ. 15 for the pth VTR bandwidth component of z.

Substituting (13) into (11), an approximate conditional acoustic observation probability can be obtained, where the mean vector $\mu_{o_s}$ is expressed as a linear function of the VTR vector z:

$$p(o(k)|z(k),s) \approx N(o(k); \mu_{o_{s(k)}}, \Sigma_{r_{s(k)}})$$ EQ. 16 where, $$\mu_{o_{s(k)}} = F'[z_o(k)]z(k) + [F[z_o(k)] - F'[z_o(k)]z_o(k) + \mu_{r_{s(k)}}]$$ EQ. 17

One aspect of the HTM is its ability to provide a likelihood value for a sequence of acoustic observation vectors o(k) in the form of cepstral parameters. The computed likelihood provides a natural scoring mechanism comparing different linguistic hypotheses as needed in speech recognition. No VTR values z(k) are needed in this computation as they are treated as hidden variables. The values are marginalized (i.e., integrated over) in the likelihood computation. Given the model construction and the approximation described above, the HTM likelihood computation by marginalization can be carried out in a closed form. The final result of the computation is as follows:

$$p(o(k)|s) = \int p[o(k)|z(k),s] p[z(k)|s] dz$$ EQ. 18

$$= N\left\{o(k); \bar{\mu}_{o_{s(k)}}, \bar{\Sigma}_{o_{s(k)}}\right\}$$

Where the time-varying mean vactor is:

$$\bar{\mu}_{o_s}(k) = F[z_o(k)] + F'[z_o(k)][a_k \cdot \mu_T - z_o(k)] + \mu_{r_{s(k)}}$$

And the time-varying covariance matrix is:

$$\bar{\Sigma}_{o_s}(k) = \Sigma_{r_{s(k)}} + F'[z_o(k)] \Sigma_z(k) (F'[z_o(k)])^{Tr}$$ EQ. 19

To facilitate the development of the parameter learning algorithms for VTR targets' distributional parameters, diagonality of the prediction cepstral residual's covariance matrix $\Sigma_{r_{s(k)}}$ can be assumed. Denoting its j-th component by $\sigma_r^2(j)$ ($j=1, 2, \ldots J$), the multivariate Gaussian of equation 18 can be decomposed element-by-element into:

$$p(o(k)|s(k)) = \prod_{j=1}^{J} \frac{1}{\sqrt{2\pi\sigma_{\bar{o}_{s(k)}}^2(j)}} \exp\left\{-\frac{(o_k(j) - \bar{\mu}_{\bar{o}_{s(k)}}(j))^2}{2\sigma_{\bar{o}_{s(k)}}^2(j)}\right\} \quad \text{EQ. 20}$$

where $o_k(j)$ denotes the j-th component (i.e. j-th order) of the cepstral observation vector at frame k.

Parameter learning algorithms can be used for the HTM to learn parameters of the model, namely mean and covariance matrices for the cepstral residual model and mean and covariance matrices for the VTR targets. In learning, cepstral observation data can be used as the training set. The criterion used for this learning is to maximize the observation likelihood in equation 20.

Learning Cepstral Residuals' Distributional Parameters

This subset of the HTM parameters consists of 1) the mean vectors $\mu_{r_s}$ and 2) the diagonal elements $\sigma_{r_s}^2$ in the covariance matrices of the cepstral prediction residuals. Both of these parameters are conditioned on phone or sub-phone s.

Mean Vectors

To find the ML estimate of parameters $\mu_{r_s}$, the following equation can be used:

$$\frac{\partial \log \prod_{k=1}^{K} p(o(k)|s)}{\partial \mu_{r_s}} = 0_1$$

where $p(o(k)|s)$ is given by equation 20, and K denotes the total duration of sub-phone s in the training data. This gives:

$$\sum_{k=1}^{K} [o(k) - \bar{\mu}_{o_s}] = 0$$

This leads to the estimation formula of:

$$\hat{\mu}_{r_s} = \frac{\sum_{k} [o(k) - F[z_0(k)] - F'[z_0(k)]\mu_z(k) + F'[z_0(k)]z_0(k)]}{K} \quad \text{EQ. 20}$$

Diagonal Covariance Matrices

Denote the diagonal elements of the covariance matrices for the residuals as a vector $\sigma_{r_s}^2$. To derive the ML estimate, the following equation can be used:

$$\frac{\partial \log \prod_{k=1}^{K} p(o(k)|s)}{\partial \sigma_{r_s}^2} = 0 \quad \text{EQ. 21}$$

This gives:

$$\sum_{k=1}^{K} \left[\frac{\sigma_{r_s}^2 + q(k) - (o(k) - \bar{\mu}_{o_s})^2}{[\sigma_{r_s}^2 + q(k)]^2}\right] = 0, \quad \text{EQ. 22}$$

where vector squaring above is the element-wise operation, and:

$$q(k) = \text{diag}[F'[z_0](k)]\Sigma_z(k)(F'[z_0(k)])^{Tr}]. \quad \text{EQ. 23}$$

Due to frame (k) dependency of the denominator in equation 23, no simple closed-form solution is available for solving $\sigma_{r_s}^2$ from equation 23. Different techniques can be used for seeking approximate ML estimates.

Frame-independent approximation: Assume the dependency of $q(k)$ on time frame k is mild, or $q(k) \approx \bar{q}$. Then, the denominator in equation 23 can be cancelled, yielding the approximate closed-form estimate of:

$$\hat{\sigma}_{r_s}^2 \approx \frac{\sum_{k=1}^{K} \{(o(k) - \bar{\mu}_{o_s})^2 - q(k)\}}{K} \quad \text{EQ. 24}$$

Direct gradient ascent: Make no assumption of the above, and take the left-hand-side of equation 23 as the gradient $\nabla L$ of log-likelihood of the data in a standard gradient-ascent algorithm:

$$\sigma_{r_s}^2(t+1) = \sigma_{r_s}^2(t) + \epsilon_t \nabla L(o_l^K | \sigma_{r_s}^2(t)),$$

where $\epsilon_t$ is a heuristically chosen positive constant controlling the learning rate at the t-th iteration.

Constrained gradient ascent: This technique improves on the previous standard gradient ascent by imposing a constraint that the variance estimate is always positive. The constraint is established by the parameter transformation: $\tilde{\sigma}_{r_s}^2 = \log \sigma_{r_s}^2$, and by performing gradient ascent for $\tilde{\sigma}_{r_s}^2$ instead of for $\sigma_{r_s}^2$:

$$\tilde{\sigma}_{r_s}^2(t+1) = \tilde{\sigma}_{r_s}^2(t) + \tilde{\epsilon}_t \nabla \tilde{L}(o_l^K | \tilde{\sigma}_{T_s}^2(t)),$$

Using a chain rule, a new gradient $\nabla \tilde{L}$ is related to the gradient $\nabla L$ before parameter transformation in a simple manner:

$$\nabla \tilde{L} = \frac{\partial \tilde{L}}{\partial \tilde{\sigma}_{r_s}^2} = \frac{\partial \tilde{L}}{\partial \sigma_{r_s}^2} \frac{\partial \sigma_{r_s}^2}{\partial \tilde{\sigma}_{r_s}^2} = (\nabla L)\exp(\partial \tilde{\sigma}_{r_s}^2).$$

At the end of algorithm iterations, the parameters are transformed via $\sigma_{r_s}^2 = \exp(\tilde{\sigma}_{r_s}^2)$, which is guaranteed to be positive. For efficiency purposes, parameter updating in the above gradient ascent techniques can be carried out after each utterance in training, rather than after an entire batch of all utterances.

Among the three techniques above, the first one can be faster but gives a slightly lower performance than the other two techniques which can be computationally more expensive. The second technique can occasionally cause poor training when the variance estimate becomes negative. To avoid the negative variance estimates, careful setting of the learning rate. The third technique is robust against the above problem but can be used slower than the first technique while comparable to the second one in computation.

Learning VTR targets' Distributional Parameters

This subset of the HTM parameters consists of 1) the mean vectors $\mu_{T_s}$ and 2) the diagonal elements $\Sigma_{T_s}$ in the covariance matrices of the stochastic segmental VTR targets. They also are conditioned on phone segment s.

Mean Vectors

Optimizing the log likelihood function of equation 20 with respect to the joint parameter set $\mu_{T_s}$ (i.e., including each phone indexed by l and each of the vector component indexed by f in $\mu_{Ts}(l, f)$) results in a large full-rank linear system of equations.

Taking the derivatives of:

$$P = \sum_{k=1}^{K} \sum_{j=1}^{J} \left\{ -\frac{(o_k(j) - \bar{\mu}_{o_{s(k)}}(j))^2}{\sigma^2_{o_{s(k)}}(j)} \right\}$$

with respect to each VTR target for each speech unit $l_o$ and for each dimension $f_o$, and setting the results equal to zero:

$$\frac{\delta P}{\delta \mu_T(l_o, f_o)} = 0 \qquad \text{EQ. 25}$$

results in a 464×464 full-rank linear system of equations, where each equation in the system is described by:

$$\sum_f \sum_l A(l, f; l_o, f_o)\mu_T(l, f) = \qquad \text{EQ. 26}$$

$$\sum_{k=1}^{K} \left\{ \sum_{j=1}^{J} \frac{F'[z_o(k), j, f_o]}{\sigma^2_{o_{s(k)}}(j)} d_k(j) \right\} a_k(l_o)$$

where $$A(l, f; l_o, f_o) = \sum_{k=1}^{K} \sum_{j=1}^{J} \frac{F'[z_o(k), j, f]F'[z_o(k), j, f_o]}{\sigma^2_{o_{s(k)}}(j)} a_k(l_o)a_k(l) \qquad \text{EQ. 27}$$

$$d_k(j) = o_k(j) - F[z_o(k), j] + \sum_f F'[z_o(k), j, f]z_o(k, f) - \mu_{r_{s(k)}}(j) \qquad \text{EQ. 28}$$

with each equation in the system having a different combination of $(f_o, l_o)$ where $f_o$ is one of the VTR dimensions and $l_o$ is one of the speech units.

Diagonal Covariance Matrices

To establish the objective function for optimization, we take logarithm on the sum of the likelihood function equation 20 (over K frames) can be used to obtain:

$$L_T \alpha - \sum_{k=1}^{K} \sum_{j=1}^{J} \left\{ \frac{(o_k(j) - \bar{\mu}_{o_{s(k)}}(j))^2}{\sigma^2_{r_s}(j) + q(k, j)} + \log[\sigma^2_{r_s}(j) + q(k, j)] \right\}$$

where $q(k; j)$ is the j-th element of the vector $q(k)$ as defined in 21). When _ (k) is diagonal, it can be shown that:

$$q(k, j) = \sum_f \sigma^2_{c(k)}(f)(F^l_{jf})^2 = \sum_f \sum_l v_k(l)\sigma^2_T(l, f)(F'_{jf})^2$$

where $F'_{jf}$ is the (j, f) element of Jacobian matrix $F'[\cdot]$ in equation 23, and the second equality in the above is due to equation 10. Using chain rule to compute the gradient, the following can be obtained:

$$\nabla L_T(l, f) =$$

$$\frac{OL_T}{O\sigma^2_T(l, f)} = \sum_{k=1}^{K} \sum_{j=1}^{J} \left\{ \frac{(o_k(j) - \bar{\mu}_{o_{s(k)}}(j))^2 (F'_{jf})^2 v_k(l)}{[\sigma^2_{r_s}(j) + q(k, j)]^2} - \frac{(F'_{jf})^2 v_k(l)}{\sigma^2_{r_s}(j) + q(k, j)} \right\}$$

Gradient-ascend iterations can then proceed as follows:

$$\sigma^2_T(l, f) \leftarrow \sigma^2_T(l, f) + \epsilon \nabla L_T(l, f),$$

for each phone l and for each element f in the diagonal VTR target covariance matrix.

Figure 4:
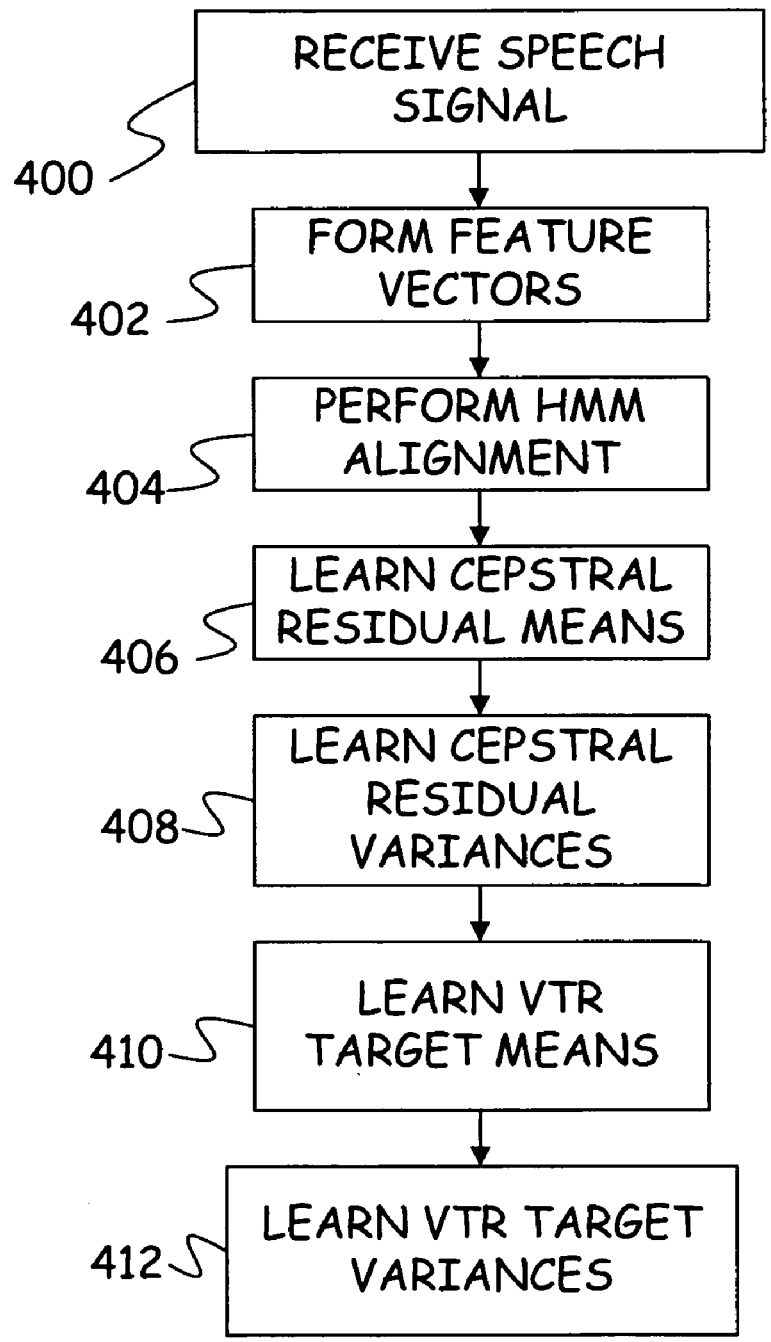
FIG. 4 is a flow diagram for training means and variances for a hidden trajectory model.
Figure 5:
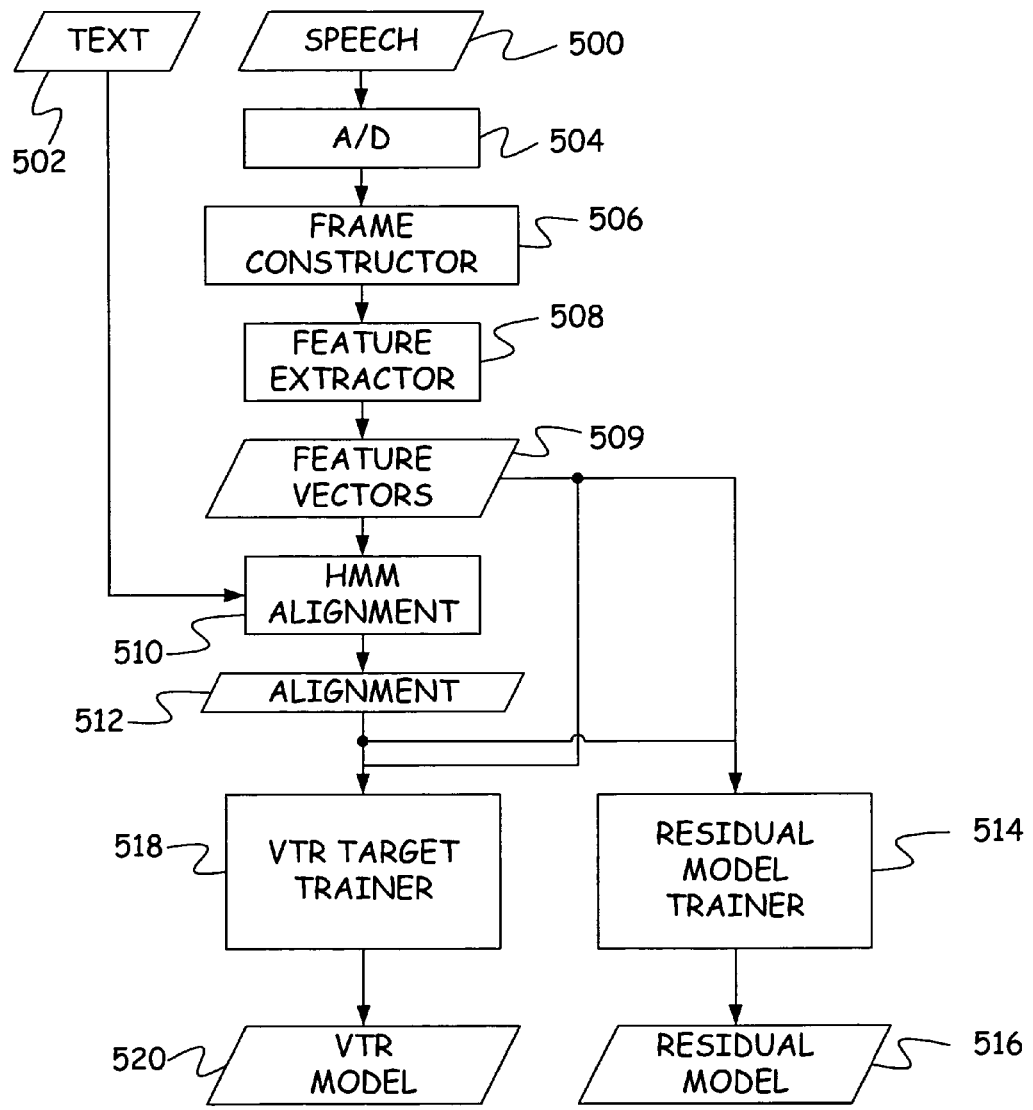
FIG. 5 is a block diagram of elements used in the process of FIG. 4.

FIG. 4 provides a method and FIG. 5 provides an apparatus that are used with the equations above to estimate parameters for an HTM. In particular, means and variances for cepstral residual models and VTR targets can be estimated based on the equations above.

In step 400, a speech signal 500 generated by a trainer reading from a text 502 is received by an analog-to-digital (A/D) converter 504. At step 402, the speech signal is converted into observed feature vectors 509 by converting the analog signal into digital samples using A/D converter 504, forming frames of digital samples using frame constructor 506, and forming a feature vector for each frame using feature extractor 508. In one embodiment, A/D converter 504 samples the analog speech signal at 16 kHz with 16 bits per sample, thereby creating 32 kilobytes of speech data per second and frame constructor 506 creates a new frame every 10 milliseconds that includes 25 milliseconds worth of data. Under one embodiment, feature extractor 508 extracts Linear Predictive Coding cepstral feature vectors, which are well known in the art.

At step 404, observed feature vectors 509 are aligned with speech units by a Hidden Markov Model (HMM) alignment unit 510. HMM alignment unit 510 uses a dictionary (not shown) to divide text 502 into speech units. It then aligns the sequence of observed feature vectors 509 with the speech units using a Hidden Markov Model (not shown), which describes the probability of each speech unit given the sequence of observed feature vectors 509. This results in an alignment 512 which associates feature vectors (and thereby the frames associated with the feature vectors) with speech units in the training speech signal.

The process of FIG. 4 continues at step 406 where cepstral residual means learned by residual model trainer 514. As noted above, the cepstral residual means are determined using the equations presented above and alignment 512. Once cepstral residual means have been learned, the process continues at step 408 where the cepstral residual variances are learned using residual model trainer 514. The variances are learned based on equations above, and a residual model 516 is output.

At step 410, VTR target means are learned by a VTR target trainer 518 using equations above. At step 412, VTR target variances are learned using VTR target trainer 518 and equations above. A VTR model 520 is then output for use in a speech recognition system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of training a model to characterize coarticulation and reduction in a speech signal using a computer with a processor, comprising:

calculating, with the processor, a likelihood function for an observation vector derived from cepstral observation data corresponding to speech as an objective function;

using a gradient ascent algorithm, using a frame independent approximation that provides a closed form solution, to estimate, with the processor and based on the calculated objective function, covariance matrices for the model, the covariance matrices being estimated independent of a time frame corresponding to the cepstral observation data, wherein the model gives a probability of a vocal tract resonance (VTR) trajectory as a filtered sequence of VTR target frequencies and a probability of the observation vector, given as a function of the VTR trajectory and an acoustic model having cepstral residuals as acoustic parameters, and wherein the covariance matrices are estimated such that at least one covariance matrix is used for generating the probability for the filtered sequence of vocal tract target frequencies and at least a second covariance matrix is used for the acoustic cepstral residuals used by the acoustic model; and outputting with the processor, the model for use in modeling coarticulation and reduction in the speech signal to recognize speech.

2. The method of claim 1 and further comprising utilizing a likelihood function for an observation vector as the objective function to estimate means for the filtered sequence of vocal tract target resonances and the cepstral residuals used by the acoustic model.

3. The method of claim 2 and further comprising forming, as the model, a hidden trajectory model based on the estimated means and covariance matrices.

4. The method of claim 1, wherein the gradient ascent algorithm is constrained.

5. A computer implemented method of training a model to characterize coarticulation and reduction in a speech signal using a computer with a processor, comprising:

using a gradient ascent algorithm, using a frame independent approximation that provides a closed form solution, to estimate, with the processor and based on a calculated objective function, covariance matrices for a model, the covariance matrices being estimated independent of a time frame corresponding to a collection of cepstral observation data, wherein the model gives a probability of a vocal tract resonance (VTR) trajectory as a filtered sequence of VTR target frequencies and a probability of an observation vector derived from the collection of cepstral observation data;

outputting with the processor, the model for use in modeling coarticulation and reduction in the speech signal to recognize speech.

6. The method of claim 5, wherein the observation vector is given as a function of the VTR trajectory and an acoustic model having cepstral residuals as acoustic parameters.

7. The method of claim 5, wherein the covariance matracies are estimated such that at least one covariance matrix is used for generating the probability for the filtered sequence of vocal tract target frequencies.

8. The method of claim 5, wherein the gradient ascent algorithm is constrained.

* * * * *